July 20, 1971  S. M. DE CORSO ET AL  3,594,153
COPPER ORE REDUCTION AND METAL REFINING PROCESS
Filed June 18, 1970

United States Patent Office 3,594,153
Patented July 20, 1971

3,594,153
COPPER ORE REDUCTION AND METAL
REFINING PROCESS
Serafino M. De Corso, Media, Pa., and Peter F. Kienast, Phoenix, Ariz., assignors to Westinghouse Electric Corporation, Pittsburgh, Pa.
Continuation-in-part of application Ser. No. 554,427, June 1, 1966. This application June 18, 1970, Ser. No. 47,296
Int. Cl. C22d 7/00, 7/08
U.S. Cl. 75—10
26 Claims

ABSTRACT OF THE DISCLOSURE

Processes for performing any one or more, or all of the steps required for reducing raw copper ore and obtaining refined pure copper, in which all essential steps of the process may be carried out with a single crucible or ladle, or a number of crucibles may be utilized, each for one or more steps. For heating, an electric arc is formed from and between the uppermost portion of the conductive material in the crucible, whether ore, matte, blister, or copper, and an electrode is employed having a tip composed of substantially pure copper forming an arcing surface, with magnetic field coil means in the tip to set up a magnetic field to move the arc substantially continuously around the tip, and an axially extending passageway through the electrode utilizable for bringing into the crucible or into the melt ore, oxygen, matte, iron, blister copper, a reducing agent, or any other material essential to one or more of the processes or steps. Normally the arcing surface is spaced from the upper surface of the melt, except for certain special operations. Refined copper is tapped from the bottom of the crucible, and slag as formed is periodically removable by a spout on the crucible, which may be tilted.

CROSS REFERENCE TO RELATED APPLICATIONS

This application is a continuation-in-part of copending application Ser. No. 554,427, filed June 1, 1966, now abandoned.

BACKGROUND OF THE INVENTION

Field of the invention

The invention relates to processes for producing refined substantially pure copper from a number of copper ores, as well as steps for producing matte from ore, producing blister copper from matte, producing refined copper from blister copper, and further a process for producing effects similar to those obtained by the ore-roasting step frequently employed in ore reduction.

Description of the prior art

It is old in the art to employ an electric arc or sparking from an electrode to molten material or molten slag in a refining process, as exemplified by Pat. No. 3,203,883 issued Aug. 31, 1965, to Ototani et al. for "Method of Refining Molten Metals by Electrolyzing Molten Slag Under Arc Discharge"; and Pat. No. 3,163,521, issued Dec. 29, 1964, to Rinesch for "Process and Apparatus for the Recovery of Liquid Iron by Reacting Iron Oxide Ore." The patent to Rinesch also shows that it is old in the art to, in a metal refining process, feed material through an axially extending passageway in an electrode from which an arc takes place to a melt.

Copper has been refined in the past by utilizing a hydrocarbon fuel blended with air or oxygen to supply the necessary heat, as exemplified by Pat. No. 3,258,330, issued June 28, 1966, to Ito for "Pyrometallurgical Refining Process for Copper."

Generally speaking, prior art processes for refining copper have been legion in their number and variations, because while ores of copper are usually of three main types, native, oxide, or sulfide, the concentration of copper in the ore may vary from about 0.8 percent to 50 percent, and the impurities which may be found are too numerous to describe in detail. For a full discussion of this subject, reference may be had to a publication of the American Chemical Society entitled "Copper; the Science and Technology of the Metal, Its Alloys and Compounds," edited by Allison Butts, Reinhold Publishing Corp., N.Y., 1954. Chapter 4, pp. 72 to 118 inclusive, entitled "Roasting, Smelting, and Converting" is expressly incorporated herein by reference.

Other words describing the prior art include a work by Hofman and Hayward entitled "Metallurgy of Copper," 2nd ed., McGraw-Hill, 1924; and Greenawalt: "Hydrometallurgy of Copper," McGraw-Hill, 1912.

Other patented prior art includes Japanese Pat. No. 169,016, granted Dec. 28, 1944.

In carrying out the processes of the invention described herein, an electrode is employed having a magnetic field coil in the tip or near the arcing surface for setting up a magnetic field which exerts a force on the arc which causes the arc to move substantially continuously around the arcing surface. The idea that a magnetic field coil could be used to produce arc rotation and thereby reduce erosion appears in the prior art as exemplified by Pat. No. 3,194,941, issued July 13, 1965, to Baird for "High Voltage Arc Plasma Generator," but Baird does not show such a magnetic field coil, nor does Baird show an axially extending passageway through the electrode which would permit material, gas, fluid, or solid, to be fed into the upper end of the electrode to pass out through an opening at the lower or arcing surface end of the electrode.

A frequently used prior art process for copper refining is the age-old and laborious open hearth process with the basic oxygen furnace procedure. This prior art process require multiple furnaces and the transfer of the product at various stages between the furnaces. Typically the raw ore is mined, crushed and copper sulphide recovered in a flotation process which results in the formation of copper sulphide and a mixture containing about 30% copper. This mixture is subsequently melted down and impurities removed as slag, producing copper sulphide of about 65% purity called matte. The matte is then heated in the presence of oxygen and iron, and iron silicate is skimmed off the melt, producing copper oxide with small amounts of arsenic, called blister. The blister is then refined in a reverberatory furnace (a type of copper open hearth) in the presence of reducing agents to produce copper.

SUMMARY OF THE INVENTION

Our invention eliminates the necessity for a large part of the apparatus required in the prior art process, as well as eliminating the transfer of the work material between furnaces or crucibles. According to one method of our invention we employ a non-consumable electrode which has the arcing surface fluid cooled and has a field coil mounted in the electrode for causing the arc to rotate continuously around the electrode so that the electrode is not destroyed. The electrode may have a passageway centrally disposed thereof and extending the entire length of the electrode, and in the various stages of the process materials may be added to the melt of the furnace through this passageway in the electrode. The materials which may be added through the passageway in the electrode include ore, matte, iron, oxygen or air, blister, and a reducing agent, for example coke or methane. According to one method of our invention this electrode is disposed with respect to material in a furnace in which at least partially electrically conductive material within the furnace forms a surface of opposite polarity to which the arc takes place. The furnace is provided with a spout at a predetermined position along the vertical dimension thereof for removing slag or other material, and the furnace is provided with a tap in the bottom thereof which may be opened and closed at will through which may be obtained, according to one method of our invention, refined copper and according to other methods of our invention, certain mixtures or compounds produced by certain steps in the process.

According to other methods of our invention, we employ a similar furnace with three spaced electrodes connected to a three phase source. The three electrodes may be connected to a "Y" source which has the center electrically connected to the melt material in the furnace producing three arcs of the three phases, or the three electrodes may be connected to a delta source, a common current return path being provided through the at least partially conductive material within the furnace. Also, the electrodes may be connected so that the return electrical path is through the electrodes themselves, that is, the bath is essentially electrically "floating."

According to other methods of our invention, we employ three similar furnaces, each one having at least one non-consumable electrode producing an arc to the melt material therein, the three similar furnaces carrying out three essential steps of the complete or overall process of producing refined copper from copper ore.

DESCRIPTION OF PROCESSES INCLUDING THE PREFERRED

Figure 1:
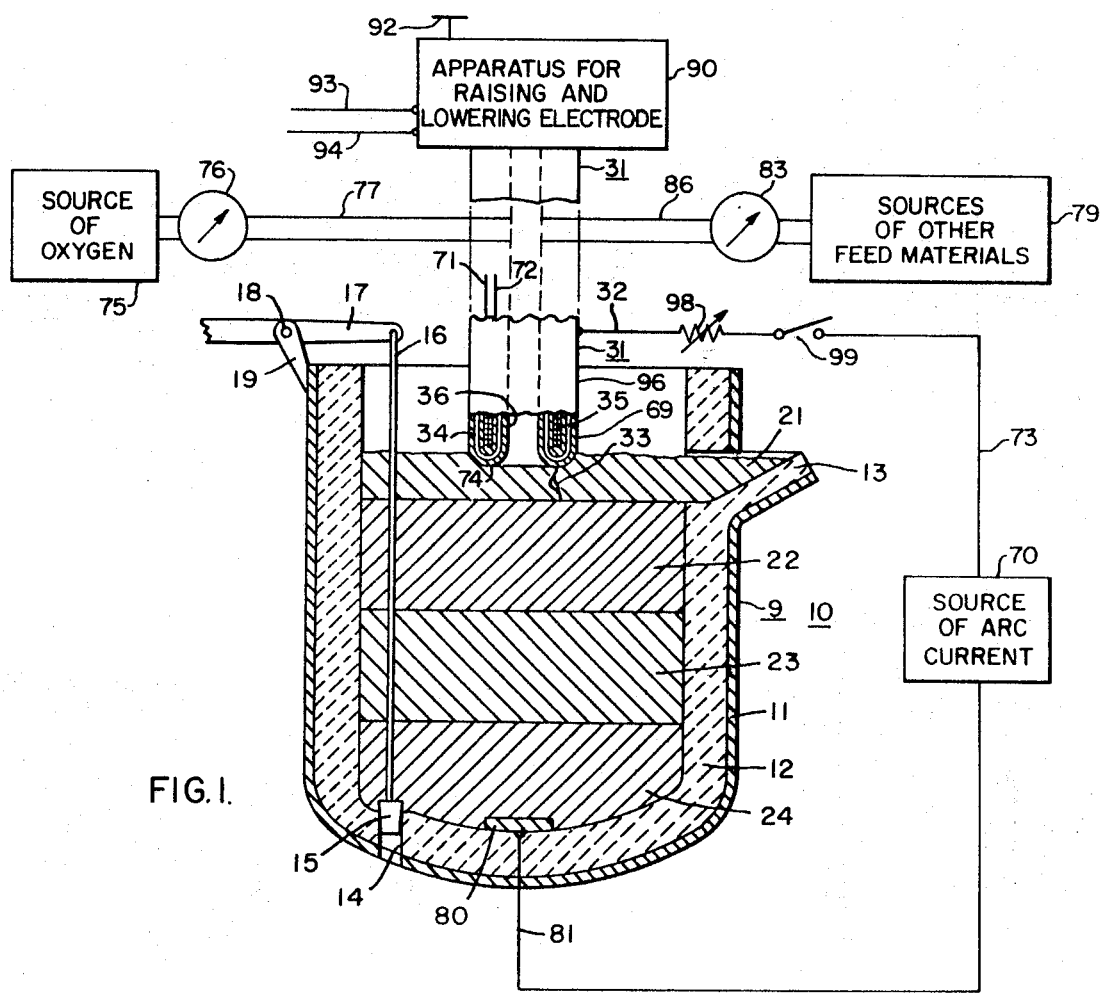
FIG. 1 illustrates our invention according to one process thereof and apparatus suitable for practicing the process of the invention.

Referring particularly to FIG. 1, there is shown a furnace generally designated 10 and a crucible or ladle generally designated 9. The crucible 9 has an outer wall of strong metallic material 11 and an inner wall of thick refractory material 12, has a spout 13 located thereon at a predetermined position along the vertical dimension of the furnace, and has a tap 14 in the bottom thereof which may be opened or closed at will, and is normally closed by plug 15 attached by a long rod 16 to a lever 17 pivoted for rotation at 18 to an arm 19 attached to the wall of the furnace or crucible. The crucible generally designated 9 is shown as containing a slag layer 21, a layer of matte 22, a layer of blister 23, and a bottom layer of refined copper 24.

An electrode for producing an arc which heats the material within the furnace is generally designated 31, and has a lead 32 thereto which symbolically represents means for bringing electrical power to the electrode to produce the arc 33. Lead 32 has rheostat 98 in series therein symbolizing means for adjusting the current in and power of the arc 33, the rheostat being connected to one terminal of a circuit-opening and circuit-closing switch 99 connected by lead 73 to a terminal of one polarity of a source of arc potential and arc current shown in block form at 70. The source of arc current may be direct current or alternating current, as will be seen more fully hereinafter. The terminal of opposite polarity of source 70 is connected by lead 81 to an electrode 80 mounted on the bottom of and inside the crucible 9. Leads 71 and 72 are for energizing magnetic field coil 35 in the electrode. As illustrated, the arc 33 is shown taking place to the layer of matte 22 which has a higher conductivity than the layer of slag above, but it should be understood that the arc 33 may take place to the layer of slag, and in an initial step of the complete refining process might do so. The electrode generally designated 31 has a tip portion 69 with the arcing surface 74 thereof cooled by the continual passage of fluid in a passageway near the arcing surface for conducting heat flux therefrom, this fluid flow passageway being designated 34. As previously stated the electrode has a field coil 35 disposed therein near the arcing surface for producing a magnetic field which causes the arc to rotate substantially continuously and prevent a burn-through of the electrode at the point of the intensely hot arc spot. As previously stated, the electrode has a central passageway extending therethrough, this passageway being designated 36.

Mounted by any convenient means, not shown, above the crucible 9 is apparatus shown in block form at 90 for raising and/or lowering the electrode, with a control 92 for controlling the apparatus 90, and leads 93 and 94 for connecting apparatus 90 to a source of power. It will be understood that the electrode has a sufficiently long supporting column portion 96 that the electrode arcing surface may extend deep into the crucible 9 in accordance with the level of the material therein. Preferably, the electrode may be lowered so far that the arcing surface thereof touches or almost touches the bottom of the crucible, and as will be seen more fully hereinafter, when this is done to perform a specific objective, switch 99 is open so that the arc is shut off.

A source of oxygen is shown in block form at 75, the flow of which is controlled by valve 76 in conduit means 77 communicating with the central passageway 36 extending axially through the electrode. Source(s) of other feed material(s) which may be a plurality of sources selectively connected to the axial passageway through the electrode, are shown in block form at 79, the flow or feed rate of which are controlled by control means 83 in conduit or feed passageway 86 communicating with axially extending passageway 36 through the electrode.

It will be understood that FIG. 1 represents a simplified schematic view. In practice, the apparatus for raising or lowering the electrode would be so mounted with respect to the top of the electrode as to leave free access to the opening into the axial passageway at the upper end of the electrode, and materials would be fed into the axial passageway through the opening at the upper end. An electrode identified elsewhere as suitable for practicing the methods of the invention shows such an upper opening.

The details of the electrode itself are not part of our invention. A suitable electrode is described and claimed in the application of S. M. DeCorso for "Electrode," Ser. No. 479,965, filed Aug. 16, 1965, now issued Pat. No. 3,369,067, it being understood that the high electrical conductivity, high thermal conductivity material of the tip is copper or copper coated so that any material eroded from the tip by arc action thereon and becoming part of the melt does not represent an undesirable impurity which represents contamination of the melt, said patent being assigned to the assignee of the instant invention.

As previously stated, according to one method of our invention all of the steps from reducing the crude ore to producing the refined copper can be carried on in a single furnace. According to this method of practicing our invention we first feed into the furnace the copper ore and certain fluxes, flux being a material which makes slag more flexible. One suitable flux material is a mixture of silica and calcium carbonate. The ore and the flux may be fed through the opening in the electrode or may be put into the furnace along the sides thereof. After the arc has heated this mixture there is produced in the furnace a layer of slag and a layer of matte. As previously stated matte is a copper sulphide of about 65% purity. After the ore and the flux have been heated for a sufficiently long length of time to produce the slag and the matte in substantially the maximum quantities which could be produced, iron and oxygen or air are fed into the mixture. The oxygen or air can be fed through the central opening 36 in the electrode. The iron can be fed through the central opening 36 or can be fed into the mixture separately. The resulting material or mixture in the furnace is heated for a length of time, yielding what is known in the trade as blister, a relatively high purity copper which contains some copper oxide, and may contain iron and sulphur in small amounts as impurities.

Next a reducing agent is added to the blister, the reducing agent being added through the central opening of the electrode. Examples of suitable reducing agents are coke and methane. Further heating of the work material results in refined copper which gravitates toward the bottom of the furnace and can be tapped off through the tap 14.

Accordingly it is seen that according to one method of practicing our invention we are continually removing slag, adding ore and tapping copper, the slag being removed as desired by tilting the furnace so that the slag runs out through the aforementioned spout 13.

Summarizing some of the advantages which our aforedescribed process offers over the prior art (which advantages in whole or in part also apply to step processes hereinafter described):

(I) During heating stages and material feed stages, the arcing surface is spaced from the surface of the melt, and the magnetic field generated in the electrode tip causes the arc to rotate substantially continuously around the annular arcing surface. (The direction of rotation is reversed at the beginning of each alternation where single phase alternating current supplies the arc and the magnetic field coil is excited by direct current.) As material is fed through the central bore of the electrode the rotating arc assures maximum uniformity of heat application to material being fed and the surrounding bath material. The arc rotation is so rapid (of the order of an easily obtainable 1200 ft./sec. or approximately 1200 revolutions per second) that it is substantially impossible for material to issue in any direction from the space between electrode tip and melt surface without being acted upon by the arc.

As will be readily understood by those skilled in the art, if the arc were not rotated, the arc could become relatively fixed or attached at some point on the periphery of the arcing surface and the feed material could issue through the space on the opposite side of the electrode with little or no heating of the fed material.

(II) No contamination of the copper or copper ore will occur from the electrode since the electrode is nonconsumable as a result of the fluid cooled arcing surface and the rapidly moved arc which causes the arc spot dwell time at any point on the arcing surface to be so brief that the copper of the tip, while instantaneously melted by the hot arc spot which may have a temperature of the order of 40,000 degrees F., is quickly allowed to cool before material is lost by evaporation or sublimation. Prior art graphite or carbon electrodes, even where the electrode is connected as an anode in a direct current circuit, lose carbon at least slowly as a result of arc action on the electrode, which carbon constitutes a very undesirable impurity contaminating the melt.

Also, as explained elsewhere, the tip of the electrode utilized in practicing the processes of our invention is preferably made of or coated with substantially pure copper, which meets the requirements of high electrical conductivity and high thermal conductivity. Any material lost from the electrode tip as a result of arc action thereon and entering the melt does not form a contaminating impurity.

(III) If desired, the electrode including the tip, utilized in practicing the processes of our invention, may be composed largely of material other than copper and the tip coated with substantially pure copper, so that copper will be the only material lost from the electrode by arc action thereon.

(IV) The rate of heat application obtainable in our processes is orders of magnitude greater (more than 100 times) than that obtainable in some prior art processes where heat is obtained by other than an electric arc. The arc process involves a temperature of the order of 40,000 degrees F. whereas other methods of heating including utilizing an exothermic reaction, burning a hydrocarbon fuel mixed with air or oxygen, various types of furnace heating where heat is generated external to the material, may be of the order of 3,500 degrees F. Therefore, in our processes, the amount of a reductant or reactant needed is substantially less and the rate or speed of reducing (and/or oxidizing) is increased many fold. The rotating arc provides an important and in some cases an essential element here in that the source of heat is spread out over a larger area or forms a larger arc zone than would be the case with a non-rotating arc device. Also, arc rotation provides for more uniformity of heat application in the area of the electrode tip than would be possible with a non-rotating arc. Also, arc rotation provides a vigorous stirring action which brings higher efficiency of heat input into more effective contact with the bath.

(V) The central bore of the electrode we employ and the metallic structure (i.e. non-graphite or non-carbon) allows higher efficiency of material and/or gas introduction because the metallic structure will support large pressures which go along with high rates of material and/or gas introduction.

(VI) Flash-smelting processes utilizing the electrode which we have described as suitable for use in our invention require less reactants because of heat addition by the arc and because of material introduction at the arc site or in the arcing zone.

(VII) Our processes eliminate the need for lances because the electrode may be utilized to serve the purpose of a lance.

(VIII) The fact that the heat source and material introduction are at the same location or in the same zone leads to high efficiency of material heating, when combined with arc rotation and stirring action.

Our processes employ the unique combination of:

(a) Material introduction at the tip and at the heat source (b) High rate of material introduction is obtained by maintaining high pressure of flow (c) The heat source is at the tip of the electrode (d) A uniform heat source is obtained due to arc rotation (e) Maximum heat source interaction with material due to stirring (f) Optional use of the electrode as blowing lance (g) Electrode tip is composed of the same material as the desired end product; no contamination results (h) The electrode employed in our processes is nonconsumable with a long electrode life (i) Convective heat flux due to arc movement is very high. Since convective heat flux is proportional to the Reynolds number raised to the 0.8 power and since arc velocities of 1200 ft./sec. are easily obtainable, as opposed to very low natural convection in other or prior art processes, the convective heat flux is approximately 1000 times faster in our process than in reaction heating (j) Radiative heating in our process is comparable to that of prior art processes by the formula $$\left(\frac{40,000° R}{4,000° R}\right)^4 = 10^4 \text{ times as fast}$$

in our process as compared to reactive heating.

It will be understood by those skilled in the art that during certain steps in the refining process it may be desirable not to add additional heat to the mixture within the furnace and during these steps the arc power may be reduced at will or cut off completely.

Ore roasting is a valuable step in many copper refining processes. Some ores appear to be self roasting (no heat is required, perhaps because of the exothermic reaction where sulfur forms chemical combinations with other elements).

Our processes include a step which accomplishes the results of roasting. Where a sulfide ore is used, it is placed in the crucible and heated by the arc to a temperature of the order of 700 to 750 degrees C., but to a temperature less than that which causes the charge to sinter. Thereafter the arc current is shut off, and the electrode lowered to a position where the tip is near or at the bottom of the crucible, and oxygen under pressure is forced through the axial passage through the electrode and exhausted near the bottom of the crucible. After a time, the charge may consist of sulfides, oxides, sulfates, and gangue (Butts, pp. 73 and 75).

Air may also be used in the roasting step, as well appear from a further discussion of roasting hereinafter.

Our invention contemplates and includes any suitable and convenient way of ascertaining when the roasting step may be considered completed, such as by analyzing the chemical content of vapor or gas coming from the surface of the melt. When the roasting process is just begun, and where oxygen is injected into the molten ore, the percentage of oxygen in gas liberated at the surface of the melt can be expected to be reduced below 100 percent because a certain percentage of the introduced oxygen is utilized in chemical combination with impurities and some escapes in the form of other gases including carbon dioxide, and some may form oxides of sulphur, so that the percentage of oxygen in total gases coming from the melt is small initially compared to the percentage existing or remaining as the roasting step nears completion and the impurities removable or chemically converted by the roasting step have been largely brought to completion.

Our invention includes making qualitative and/or quantitative chemical analysis of the raw ore in order to form an estimate of the time which the roasting step should continue.

Typical chemical equations involved in the roasting step are given on pp. 78 and 79 of the work edited by Butts, to which reference may be made.

Figure 2A:
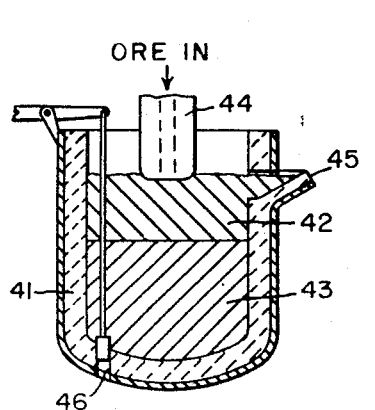
FIGS. 2A, 2B and 2C illustrate processes of our invention for carrying out certain steps according to other methods of practicing the same in which separate furnaces having non-consumable electrodes are employed for carrying out the various steps of obtaining refined copper from copper ore, it being understood that each step considered by itself is a part of our invention as well as a plurality of steps considered collectively.

As previously stated, the processes of our invention include each of the steps employing a non-consumable electrode required to convert the raw copper ore to the refined copper. In FIG. 2A, a furnace 41 has an electrode 44, a spout 45 and a tap 46. Ore is added to the furnace 41 and the layer of slag 42 may be removed at will by tilting the furnace and pouring the slag out the spout 45 whereas the layer of matte 43 may be removed from the furnace through the tap 46.

Figure 2B:
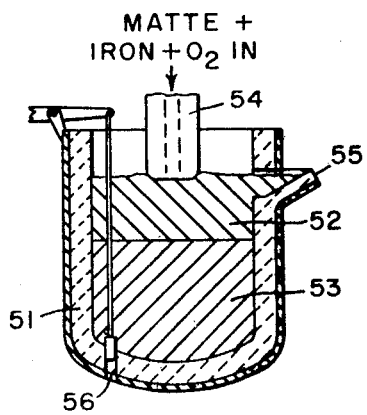

In FIG. 2B another process step in the complete process is illustrated along with apparatus for practicing this process of our invention. Furnace 51 has a spout 55, a tap 56, and a non-consumable electrode 54. Matte plus iron plus oxygen or air are added to the furnace, if desired through the opening in the non-consumable electrode 54, producing a layer of iron silicate 52 and a layer of blister 53, the blister being removable through the tap 56. A layer of slag, not shown, may cover the layer of iron silicate 52.

Figure 2C:
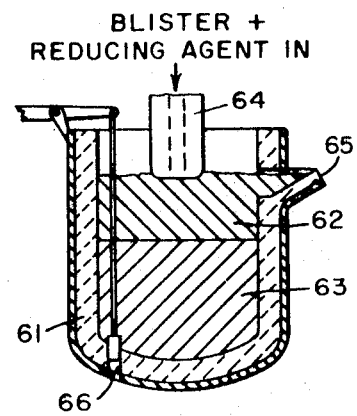

In FIG. 2C the method of carrying out the final stage of the total process is illustrated along with apparatus for practicing this method. Furnace 61 has a tap 66, a spout 65 and a non-consumable electrode 64. Through the electrode are introduced blister plus a reducing agent and in the furnace there is formed a layer of blister plus reducing agent 62, and underneath a layer of the heavier and more dense refined copper 63. The refined copper 63 may be removed through the tap 66.

It will be understood that in all of FIGS. 2A–2C where heat from the arc is desired to heat the material or mixture in the crucible, the electrode is raised so that the arcing suface is spaced from the surface of the nearest molten electrically conductive material including any slag layer.

Whereas in each of the FIGS. 2A, 2B and 2C only one non-consumable electrode is shown, it will be understood that each of these furnaces may have three or more electrodes connected to a three phase source.

Electrodes 44, 54 and 64 of FIGS. 2A, 2B and 2C respectively, may be similar to the electrode generally designated 31 of FIG. 1 and described more fully in the aforementioned copending patent application.

According to another method of our invention the furnace may be charged with copper precipitates, that is, a material obtained from ore by leaching. A copper precipitate may be defined for the purposes herein as a material high in copper content. Accordingly, a one stage operation is obtainable. The copper precipitate is almost of a purity corresponding to the purity of blister, and only one stage in the refining process is required.

Our invention contemplates charging the furnace with material in any stage of the complete refining process and carrying on from that stage either through one additional stage or until the complete refined copper is obtained.

The methods and apparatus of our invention have been described largely heretofore with respect to the sulphide ores of copper. Whereas the greater percentage of the yearly production of new copper comes from sulphide ores, our invention is also suitable for use in refining the oxide ores of copper. Where the raw ore is an oxide of copper (usually containing impurities) the refining process may include:

(a) Adding a reducing agent to the heated, molten ore; or (b) Adding iron and additional oxygen or air to the molten ore, and thereafter adding a reducing agent; or (c) Adding a flux or fluxes to the ore and heating the ore to bring the melt to a molten condition at a desired temperature; thereafter adding iron and additional oxygen or air to the molten ore; and thereafter adding a reducing agent; or (d) Adding sulphur to the molten ore to reduce the oxide to copper sulfide, a certain amount of sulphur dioxide being formed and escaping as gas, and thereafter subjecting the copper sulfide to steps similar to those heretofore described.

If the ore contains silicon as an impurity, the added iron and oxygen or air is effective in converting the silicon into iron silicate forming removable slag. Vice versa, if iron is present in the ore as an impurity, silica is added.

As in the case of sulfide ores of copper, the steps in the total refining process may accommodate the percentage of copper in the raw ore and the kinds and amounts of impurities in the raw ore.

By employing the methods and apparatus of our invention it may be possible to eliminate the selective flotation step which is frequently used on sulphide minerals for concentration by the use of gravity on the metal-producing portion of the ore. In selective flotation, the ground material to which water has been added, and selected reagents, is subjected to agitation with air to produce a froth. The reagents are so selected that large attraction exists between the surface of the valuable mineral particles and the air, and a small attraction between the gangue particles and the air. As a result, the mineral particles cling to the bubbles of the froth and are carried to the surface while the gangue particles sink to the bottom. It is then necessary to remove the froth from the container to separate, roughly, the minerals from the gangue material. Perfect separation is impossible but with careful watching and precise controls it is possible to concentrate 95% or more of the copper into 10% to 20% of the original weight.

As is well known, most sulphide ores of copper contain impurities such as arsenic, antimony, lead, zinc, bismuth, and pyrites. However, copper has a higher affinity for sulphur than any of these common impurities and copper is stable as a low-valence sulphide CuS. Many of these impurities may be volatilized by roasting the ore, which step is contemplated as part of or in addition to a further step, either when the apparatus of FIG. 1 is used, or when the apparatus of FIGS. 2A to 2C is employed. Roasting is done at moderately high temperatures in an oxidizing atmosphere and during the roasting process a portion of the sulphur is oxidized. The aforementioned impurities are removed from the charge as gases. The amount of sulphur driven from the charge is controlled by both the amount of air admitted and the temperature to which the melt is heated. As previously stated, means is provided for controlling the power of the arc 33 to thereby vary and control the temperature to which the melt in the furnace is raised.

As previously stated, during certain stages of the process it may be desirable to reduce the power of the arc and ven to cut off teh arc. As is well known, ores of high sulphur content will usually roast autogenously, that is, once the melt has been brought to roasting temperature, the heat liberated by the burning of the sulphur will maintain the temperature without the use of added heat. However, ores with a low sulphur content may require that heat be added during the roasting process.

In more detail, the reactions in the roasting process are oxidizing. Sulphur or a portion thereof is oxidized to the dioxide of sulphur and eliminated as such. Metallic sulphides, primarily those of iron, but also some copper, on losing sulphur are left in the melt as oxides. The resulting material, sometimes known as calcine, is a mixture of sulphides and oxides of iron and copper, gangue material and non-volatile impurities.

It may be said that the first step in copper smelting is to produce a molten artificial sulphide of copper and iron. This material, as previously stated, is known as matte, and should contain all the copper, the desired amount of iron, and may have a specific gravity sufficiently high to insure a clean separation from the gangue material and other undesirable compounds in the balance of the iron. Metal oxides in igneous fusion react as bases and may combine with anhydrides to form stable compounds of relatively low specific gravity. These compounds are slags and are usually formed by the use of silica, $SiO_2$ as the acid anhydride. The formation temperature and fluidity of the slag varies with its composition. The reaction of the slag on the furnace lining varies with its acidity. Accordingly it may be necessary to balance the composition of the slag, if desired results are to be obtained. This is done by the addition of selected materials to give a slag of the desired composition and properties. These materials are known as fluxes, as previously stated, the most common flux being limestone or silica $SiO_2$.

As previously stated, copper has a lower affinity for oxygen than iron or sulphur. This and the fact that the oxidation of iron and sulphur liberate large quantities of heat is the basis of matte converting, that is, converting matte into the aforedescribed blister. Molten matte is largely oxidized by introducing into it a stream of air. At the point of entry of the air, iron, sulphur and copper will be oxidized. The copper oxide may immediately react with any iron sulphides still present to reform the sulphide of the copper and form the oxide of iron. As air continues to flow through the molten mass, ultimately all the iron may be present as an oxide. The copper as a sulphide, and the sulphur originally in the iron, may have left the charge as sulphur dioxide gas. Since iron oxide will form a fusible slag with silica, it is necessary to add to the molten mass sufficient silica to form the desired slag, and all the iron may be removed as an iron silicate, while the heavy copper sulphide remains behind. The oxidation of the iron and its sulphur liberate sufficient heat to keep the material molten and melt the necessary silica and any other solid charge which it may be necessary to add. If air continues to enter the charge after the removal of the slag, the oxidation of the sulphur and the copper continues, and the copper oxide so formed reacts with the copper sulphide remaining in the charge to form sulphur dioxide and metallic copper. Ultimately, all the sulphur is oxidized, and metallic copper and a small amount of copper oxides will be present in the charge. Small amounts of minor impurities may also be present.

The final result of the matte converting step is the formation of blister copper, which in addition to copper oxide may contain small quantities of other impurities. Air may be forced through the molten material to insure complete oxidation of all impurities, and thereafter the oxides rise to the surface, where some of them may be poured off by tilting the furnace. The oxidizing treatment is followed by a reducing treatment. As previously stated, suitable reducing agents are coke and methane. As will be apparent to those skilled in the art, during the reducing process it may be desirable to take frequent samples from the bath to determine the degree of deoxidation. After the refining process is complete, substantially pure copper may be obtained by tapping the bottom of the furnace, lifting the plug 15 which normally closes the tap 14, or by lifting the plug which closes the tap 66 of FIG. 2C.

For a fuller discussion of the chemical changes which take place at various stages during the steps of ore reduction until the final refined copper is withdrawn from the furnace, reference may be had to an article appearing in the Encyclopedia Britannica, volume 6, pages 416 and 417, and to the many other works which have been published on the subject of copper refining, including those by Butts, Hofman and Hayward, and Greenawalt.

Whereas the invention has been described primarily with respect to an electrode having a central passageway extending the length thereof, it will be understood that a non-consumable electrode without such a passageway could be employed, and a cylindrical jacket enclosing but spaced from the electrode could be employed for feeding air or a reducing agent etc. to the melt. Such an electrode is described and claimed in a copending application Ser. No. 584,799 filed Oct. 6, 1966, and assigned to the assignee of the instant invention.

Our invention includes heating cathode bars to produce molten copper, and heating anode bars to produce molten copper.

Our processes as described in connection with FIG. 1 eliminate the need for transferring material between crucibles, and eliminate the need for one or more holding stations where heat must be supplied to a melt to maintain its temperature while it is awaiting use in the next step of the total refining process.

Whereas we have described the methods of our invention with respect to certain conditions and certain chemical processes and certain specific ores having certain chemical compositions, it should be understood that our invention is not limited thereto, and whereas we have described certain apparatus suitable for practicing the methods of our invention it should be understood that the apparatus shown and described is illustrative only.

We claim as our invention:

1. A process for obtaining refined copper from a copper-containing ore which comprises placing the ore in a furnace, utilizing a non-consumable electrode connected in electrical circuit means including a source of potential to produce an arc from the electrode to the ore, said arc extending substantially parallel to the longitudinal axis of the electrode, the non-consumable electrode including a fluid cooled annular arcing surface maintained spaced from the melt and a magnetic field coil mounted in the electrode which sets up a field which causes the arc to move substantially continuously in a substantially repetitious path around the arcing surface, adding flux to the ore and heating the mixture to produce a melt containing slag and matte, feeding iron and oxygen into the matte to remove impurities from the melt in the furnace and to convert most of the matte by chemical process into blister copper, thereafter adding a reducing agent to the blister copper to remove impurities therefrom and to obtain in the bottom of the furnace a layer of substantially pure refined copper, and removing the refined copper from the furnace.

2. A process according to claim 1 in which the non-consumable electrode is additionally characterized as having a passageway extending axially the entire length thereof, in which the oxygen added to the matte to obtain blister is added by way of the passageway through the electrode, and the reducing agent added to the blister to obtain more refined copper is added by way of the passageway in the electrode.

3. The process according to claim 1 in which the copper ore is additionally characterized as being a copper sulphide.

4. The process according to claim 1 in which the copper ore is additionally characterized as being a copper oxide.

5. The process according to claim 1 in which the flux material added to the slag is additionally characterized as being silica.

6. The process according to claim 1 in which the flux material added to the slag is additionally characterized as being calcium carbonate.

7. The process according to claim 1 in which the reducing agent is additionally characterized as being coke.

8. The process according to claim 1 in which the reducing agent is additionally characterized as being methane.

9. The process according to claim 1 in which the furnace is additionally characterized as having a spout at substantially a level with the slag, and which includes the additional step of periodically removing slag and other impurities by tilting the furnace so that the slag and other impurities are removed by said spout.

10. The process according to claim 1 in which the furnace is additionally characterized as having a normally closed tap with lever means operable from outside the furnace for opening the tap, and the step of removing the refined copper is carried on by opening the tap for a selected period of time.

11. A process for heating cathode bars and anode bars to produce refined copper which comprises placing at least one bar in a furnace and utilizing a non-consumable electrode having a fluid cooled annular copper arcing surface and a magnetic field coil mounted in the electrode which sets up a field which causes the arc to move substantially continuously in a substantially repetitive path over the arcing surface to produce an arc to the bar to melt the same without any substantial erosion of material from the electrode and without any substantial contamination of the material of the bar.

12. In a copper refining process for obtaining refined copper from a copper ore, the step of converting the copper ore to matte which comprises placing the copper ore in a furnace, disposing a non-consumable electrode having a fluid cooled arcing surface spaced from the ore and a field coil mounted in the electrode for rotating the arc in predetermined position with respect to the ore in the furnace and causing an electric arc to take place from the electrode to the ore in the furnace, thereafter adding flux to the ore to produce slag and matte in the furnace, and removing at least a portion of the slag from the melt in the furnace by way of spout means on the furnace at a level with the slag to produce a melt having a high concentrate of matte.

13. In the process of converting copper ore to refined copper, the step of obtaining blister copper from matte which comprises placing the matte in a furnace, disposing a non-consumable electrode in predetermined position with respect to the matte in the furnace, the non-consumable electrode having a passageway extending lengthwise therethrough, causing an arc to take place between the electrode and the matte in the furnace, the electrode including a fluid cooled arcing surface spaced from the matte and a magnetic field coil therein for setting up a field which substantially continuously rotates the arc, feeding a gas containing oxygen through the passageway of the electrode into the matte and adding iron to the matte, and maintaining the melt at a predetermined temperature for a predetermined period of time to insure substantially complete chemical change and the removal of impurities from the matte, and produce blister copper.

14. In a copper refining process for obtaining refined copper from copper ore, the step of converting blister copper to refined copper which comprises heating the blister copper in a furnace having a non-consumable electrode including a fluid cooled annular arcing surface spaced from the blister copper and a magnetic field coil mounted in the electrode which sets up a field which causes the arc to move substantially continuously in a substantially repetitive path over the arcing surface and with a passageway lengthwise therethrough, adding a reducing agent through the passageway of the electrode to the blister, and obtaining refined copper from the furnace.

15. A process according to claim 1 in which the non-consumable electrode is additionally characterized as having a passageway inside extending the length thereof, and at least one material required in the process is fed into the furnace through said passageway.

16. A process for converting a copper ore to refined copper including the steps of placing the copper ore in a furnace having a tap and having a spout at a predetermined position along the vertical dimension of the furnace, positioning a non-consumable electrode in predetermined position with respect to the ore, connecting the electrode and the ore across a source of potential to produce an arc between the electrode and the ore, the non-consumable electrode including a fluid cooled annular arcing surface spaced from any conductive material and a magnetic field coil mounted in the electrode which sets up a field which causes the arc to move substantially continuously in a substantially repetitive path over the arcing surface, the arc heating the ore and melting the same thereby producing matte, adding iron and a gas containing oxygen to the matte to chemically convert the matte to a melt of substantially blister copper, adding a reducing agent to the blister copper while heating the same to further refine the copper and remove impurities therefrom, and thereafter tapping the furnace to obtain refined copper therefrom.

17. The process according to claim 16 which includes continually adding ore to the melt in the furnace, continually removing slag through the spout of the furnace and continually tapping the furnace to obtain refined copper therefrom.

18. A process for obtaining refined copper from unrefined copper containing impurities which may be volatilized which comprises placing the unrefined copper in a furnace, and utilizing a non-consumable electrode having a spaced fluid cooled copper arcing surface and a field coil mounted in the electrode for rotating the arc to form an alternating current arc to the unrefined copper to melt the same without any substantial contamination of the copper.

19. A process for obtaining refined copper from a copper containing sulphide ore which comprises a first step of placing the ore in a furnace vessel, thereafter subjecting the ore to at least one additional process step in which a non-consumable electrode is connected in electrical circuit means also electrically connected to the ore to produce an arc from the electrode to the ore to heat the ore and reduce it to a molten state, the electrode having a tip forming an arcing surface with magnetic field coil means in the electrode near the arcing surface for generating a magnetic field which causes the arc to move substantially continuously over the arcing surface of the electrode, the arcing surface being maintained spaced from the surface of the melt, said melt containing slag and matte, feeding iron and oxygen into the matte while maintaining the matte at a predetermined desired temperature by heat at least initially applied by the arc from the electrode to remove impurities from the matte and to convert at least a substantial part of the matte by chemical reaction into blister copper, and thereafter adding a reducing agent to the blister copper to remove impurities including impurities in the form of oxides therefrom while utilizing the electric arc to supply sufficient heat in addition to any obtained from another presently existing or pre-existing heat source to maintain the blister copper at the desired temperature whereat chemical recombinations necessary for the removal of impurities may occur so that substantially pure refined copper is obtained.

20. A process according to claim 19 in which the electrode employed has an arcing surface composed of substantially pure copper extending to at least a predetermined thickness over substantially the entire exposed outside of the electrode tip.

21. A process according to claim 19 including the additional step of tapping the furnace vessel to remove refined copper therefrom.

22. A process according to claim 19 in which the furnace vessel is tiltable and has a spout at a predetermined position in the wall thereof, and including the additional step of when desired removing slag by tilting the vessel and causing slag to flow from the spout.

23. A process according to claim 19 in which the electrode has an axially extending passageway therethrough, and at least one material fed into the furnace vessel is introduced through the passageway in the electrode.

24. A process according to claim 23 in which the magnetic field coil for generating a field which exerts a force on the arc generates such a field that the arc moves around the arcing surface at a high rate of speed insuring that substantially all fed material passes through the arc path and is efficiently heated with a corresponding speed-up of chemical reaction time.

25. A process according to claim 23 including between the first step and the additional step an ore roasting operation by utilizing the arc to reduce the ore to a molten condition having a temperature within a predetermined range of temperatures, shutting off the power to the arc, lowering the electrode to a position whereat the arcing surface is near the bottom of the furnace, and forcing oxygen under pressure through the passageway through the electrode to be released within the molten ore.

26. A process for obtaining refined copper from an oxide ore of copper which includes the steps of utilizing a non-consumable electrode including arc rotating means and having an axial passageway therethrough to form an arc between electrode and ore and reduce the ore to a molten state having a temperature within a predetermined range of temperatures, and the additional step of introducing a reducing agent through the axial passageway of the electrode into the molten ore.

No references cited.

L. DEWAYNE RUTLEDGE, Primary Examiner

J. E. LEGRU, Assistant Examiner

U.S. Cl. X.R.

75—72, 73, 76